United States Patent [19]

Hutson

[11] 4,426,804

[45] Jan. 24, 1984

[54] FISHING FLOAT

[76] Inventor: Duane Hutson, 1315 Country Club Prado, Coral Gables, Fla. 33134

[21] Appl. No.: 280,983

[22] Filed: Jul. 6, 1981

[51] Int. Cl.³ .............................................. A01K 93/00
[52] U.S. Cl. .................................. 43/44.91; 43/44.95
[58] Field of Search ................... 43/44.91, 44.9, 44.92, 43/44.95, 44.89; 441/133

[56] References Cited

U.S. PATENT DOCUMENTS

| 327,100 | 9/1885 | Palm | 43/44.91 |
|---|---|---|---|
| 771,263 | 10/1904 | McCord | 43/44.91 |
| 2,077,184 | 4/1937 | Rader et al. | 43/44.87 |
| 2,754,616 | 7/1956 | Law | 43/44.91 |
| 3,019,546 | 2/1962 | Hansen | 43/44.91 |
| 3,069,802 | 12/1962 | Olsen et al. | 43/44.95 |
| 3,107,451 | 10/1963 | Sitzler | 43/44.92 X |
| 3,192,662 | 7/1965 | Hoyle | 43/44.95 X |
| 3,293,792 | 12/1966 | Bittaker, Jr. | 43/44.95 X |
| 3,557,486 | 1/1971 | Wright | 43/44.95 X |
| 3,967,407 | 7/1976 | Halbasch | 43/44.9 |
| 3,974,591 | 8/1976 | Ray | 43/44.91 |
| 4,145,833 | 3/1979 | Ratte | 43/44.91 X |

Primary Examiner—Nicholas P. Godici
Assistant Examiner—Charles L. Willis
Attorney, Agent, or Firm—Robert J. Van Der Wall

[57] ABSTRACT

A fishing float is disclosed which is comprised of two longitudinally extending half portions, lengthwisely hinged together in a manner whereby they may be opened to expose the interiors thereof and closed to form a symmetrical configuration. Each half portion defines a hollow shell with a replaceable half core therein, formed of a suitable low specific gravity closed cell form material. One half portion includes a friction jaw in each end for adjustable securing engagement with a fishing line passing therethrough, and a snap lock is formed integrally with respective mating edges of the two halves to secure said two halves in a closed condition.

8 Claims, 4 Drawing Figures

FISHING FLOAT

FIELD OF THE INVENTION

The present invention pertains to a fishing float and more particularly to a float which is manually adjustable along the fishing line whereby the fishing depth may be accurately controlled and adjusted without removing the float from the fishing line.

BACKGROUND OF THE INVENTION

U.S. Pat. No. 3,293,792 to C. R. Bittaker, Jr., discloses a fishing float structure including a main float body with a radially extending projection including a core element provided with a serpentine slit, extending longitudinally through the core, to slidably receive the fishing line to provide for slidable adjustment thereof along the line.

Another fishing float, currently commercially available and not disclosed in a prior art patent, is comprised of an elongated float member; formed of a suitable low specific gravity synthetic foam material with a concentric hole formed lengthwisely therethrough. Double lengths of a threading string extend through the hole defining a closed loop outwardly of one hole end and two loose ends of the string extending outwardly of a second end of the hole. This permits a fishing line to be inserted through the loop end and pulled through the hole or threaded by means of the two loose ends. Said commercially available device suffers from the difficulty that it cannot be fixedly attached to a desired position on the fishing line, being held in place only by friction, and is incapable of simple reuse because the threading string is normally discarded after the fishing line has been inserted through the hole using it.

Yet another currently commercially available fishing float is comprised of an elongated main body portion with a concentrically extending through hole which is substantially enlarged in cross section relative to a fishing line to be inserted therethrough. The line is manually inserted through the hole and an elongated plug member is provided for insertion through the hole to adjustably secure the fishing line therewithin. Since the plug is separate from the float, it can be lost when the fishing line is being inserted manually through the hole, and the float is rendered virtually useless by such loss.

SUMMARY OF THE INVENTION

With the foregoing in mind it is one of the principal objects of the present invention to provide a fishing float comprised of a pair of hinged together half portions which are operable from open to closed positions to adjustably secure a fishing line therebetween.

Another object of the invention is to provide a snap lock means to secure the two half portions in a closed condition without the use of a plug or other separate piece which may be lost during threading of the float on to the fishing line.

A further object of the invention is to provide the half portions in the form of interiorly hollow shells with a replaceable closed cell low specific gravity material disposed in each hollow half portion.

Yet another object of the invention is to provide friction jaw means on each end of one of the half portions to adjustably secure a fishing line passed between the half portions of the float.

A still further object of the invention is to provide the hinge means molded integrally with the shell of the half portions.

Another object of the invention is to provide a fishing float with no external projection to catch or snag onto floating materials such as grass, weeds, etc., as occurs with most commercially available fishing floats.

A principal object of the invention is to permit easy removal and replacement of the fishing float.

Other objects and advantages will become apparent to those skilled in the art upon reference to the following descriptions.

In accordance with the invention there is provided a fishing float comprised of two longitudinally extending half portions in the form of shells which are lengthwisely hinged together in a manner whereby they may be opened to expose the interiors thereof and closed to form a symmetrical configuration free from any projections that may catch or snag upon grass, seaweed, and the like. The shells of the half portions contain a replaceable low specific gravity closed cell material such as a polymer foam, for flotation purposes. One of the half portions contains a friction jaw on either end for adjustable securing engagement with a fishing line. These jaws are positioned to fit within the shell of the other half portion shell so that when both half portions are closed, the friction jaws are contained entirely within the float to avoid external projections that would snag on seaweed, etc. A snap lock is preferably formed from the same material as the shell at the respective mating edges of the two half portions to secure same in a closed condition.

The invention will be better understood upon reference to the detailed description and drawings in which:

DETAILED DESCRIPTION

Figure 1:
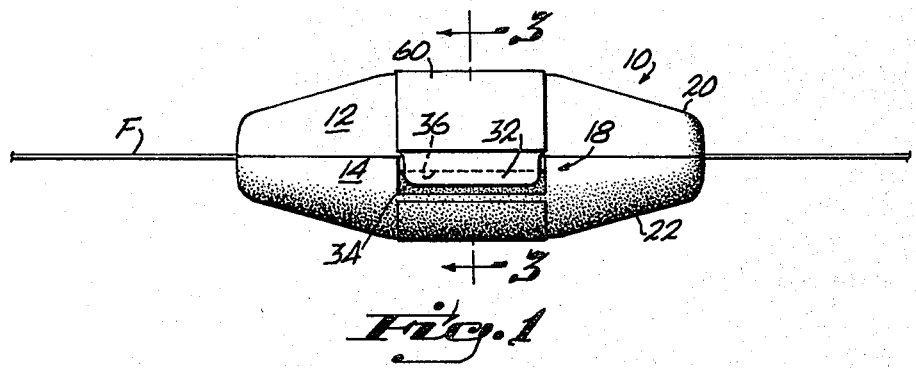
FIG. 1 is a side elevational view of the fishing float of the present invention, engaged on a fishing line.
Figure 2:
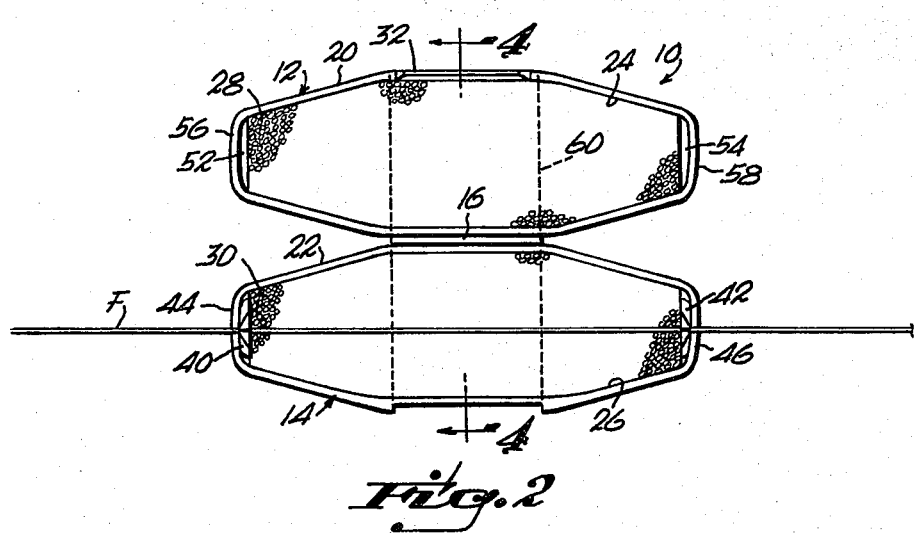
FIG. 2 is a view similar to FIG. 1 with the float in an open, unlatched condition.

With reference to the drawings and particularly to FIG. 1, the fishing float of the present invention, indicated generally at 10 is secured to a fishing line F which passes diametrically between two float half portions 12 and 14 which are hinged together at 16 as seen in FIG. 2 on a first side of the float 10 and are secured together by a snap latch, indicated generally at 18, on a second side thereof.

Figures 3, 4:
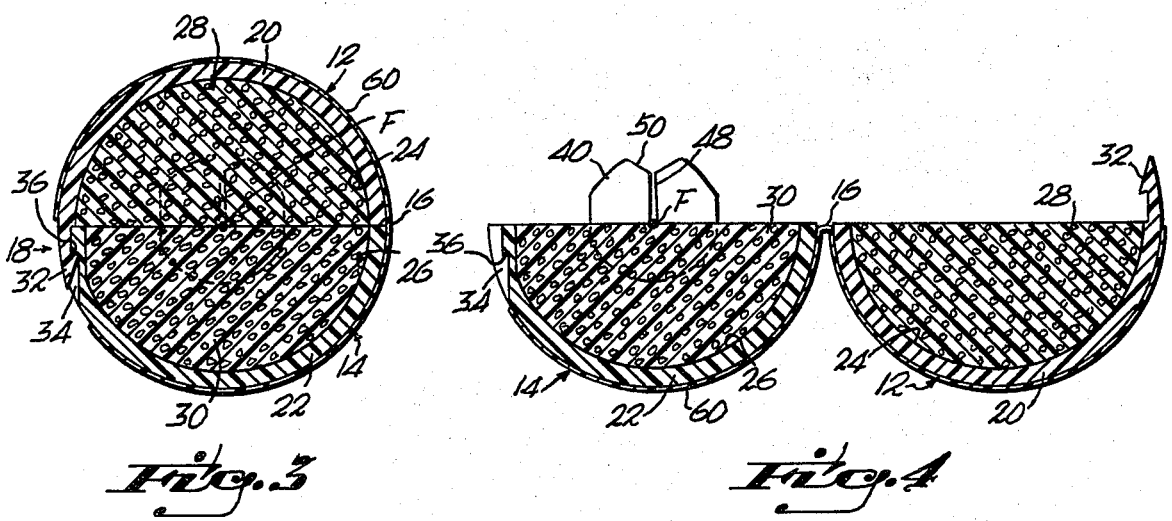
FIG. 3 is a cross sectional view taken along line 3—3 of FIG. 1.
FIG. 4 is a cross sectional view taken along line 4—4 of FIG. 2.

As best illustrated in FIGS. 2 and 4, the two halves, when unlatched, are disposed in an open position and are preferably composed of respective shell portions 20, 22 defining respective interior cavities 24, 26. Replaceable closed cell low specific gravity core portions 28, 30 are secured in the respective cavities 24, 26. Low specific gravity core portions 28, 30, having a substantially planar exposed surface when the half portions 12 and 14 are opened, are sized so that said planar surfaces will press against each other when the half portions 12 and 14 are secured together by snap latch 18. The purpose thereof is to furnish means to frictionally secure the fishing line F which passes diametrically between the two float half portions 12 and 14. The snap latch 18 is comprised of a fingernail operated pawl extension 32 from one side edge of half portion 12 and a cavity 34, defining a shoulder 36, adjacent a confronting edge of half portion 14, for secure engagement by pawl 32 in the float closed position of FIGS. 1 and 3.

A pair of friction jaw projections 40, 42 are secured in, or formed integral within opposed end walls 44, 46 of one half portion, such as 14. Each friction jaw, such as 40, FIG. 4 includes a slit 48 into which the line F is pulled and a generally V-shaped outer end lead-in 50 is provided to facilitate the insertion of line F in the respective slits 48. The jaws 40, 42 are of a somewhat resilient material to permit the slits 48 to expand somewhat, yet to securely engage the line F when engaged therein, permitting sliding movement of the float 10, with a desired degree of resistance, in either direction along line F to accommodate a desired fishing depth.

As best illustrated in FIG. 2, the core portion 28 in cavity 24 is foreshortened somewhat to define opposed open end cavities 52, 54, inwardly of end walls 56, 58 of half portion 12, to accommodate the projecting friction jaws 40, 42 in the closed position.

In a preferred form, the hinge 16 is comprised of a connecting web portion formed from the same material as the two shell portions 20 and 22. In the preferred embodiment, the composition of matter used to form shell portions 20 and 22 and hinge 16 must be able to withstand repeated extreme flexure as would occur at 16, without fatigue failure. Such compositions are well known to those skilled in the art. Alternatively, hinge 16 may be formed using a flexibe tape 60 which is adhesively secured about the two half portions of the float 10 with the exception of the latch portion 18.

Having described the presently preferred embodiments of the invention, it should be understood that various changes in construction and arrangement will be apparent to those skilled in the art and are fully contemplated there with departing from the true spirit of the invention. Accordingly, there are covered all alternatives, modifications and equivalents as may be included within the spirit and scope of the invention as defined herein by the appended claims.

What is claimed is:

1. A fishing float for selective attachment to a fishing line comprising:
    two half portions, each having outer shells defining therein cavities;
    replaceable closed cell foam flotation means disposed in the cavities;
    a flexible web portion formed of the same material as, and connecting confronting edge portions of, the outer shells comprising hinge means therebetween;
    latch means to secure the outer shells in a closed position wherein the cavities containing flotation means confront each other;
    a first means to frictionally secure the fishing line between the two half portions comprising a pair of substantially planar slit projections having a generally V-shaped outer lead-in to each of the slits which slit projections extend radially outward from respective opposed end portions of a half portion, positioned inwardly of respective end walls thereof; and
    a second means to frictionally secure the fishing line between the two half portions comprising substantially planar confronting surfaces of said flotation means of each cavity when the outer shells are secured in a closed position.

2. The fishing float as defined in claim 1 wherein the latch means comprises a pawl extension from a side edge of a first half portion, and a shoulder, adjacent a confronting edge of a second half portion for snap locking engagement by the pawl.

3. The fishing float as defined in claim 1 wherein the slits extend inwardly to a longitudinal axis defined between first and second half portions in the closed position.

4. The fishing float as defined in claim 1 wherein the flotation means in a cavity is foreshortened at both ends relative to respective end walls thereof to receive the slit projections when the outer shells are in a closed position.

5. A fishing float for selective attachment to a fishing line comprising:
    two half portions, each having outer shells defining therein cavities;
    replaceable flotation means in the form of closed cell foam material disposed in the cavities;
    hinge means connecting confronting edge portions of the outer shells comprising a flexible web portion of a piece of synthetic tape connecting between said half portions, a major portion of said tape overlying and being adhesively secured to said half portions;
    latch means to secure the outer shells in a closed position wherein the cavities containing replaceable flotation means confront each other; and
    means to frictionally secure the fishing line between the two half portions comprised of substantially planar confronting surfaces of said replaceable flotation means of each cavity when the outer shells are secured in a closed position, and further comprised of a pair of substantially planar slit projections having a generally V-shaped outer lead-in and extending radially outward from respective opposed portions of a half portion positioned inwardly of respective end walls thereof.

6. The fishing float as defined in claim 5 wherein the latch means comprises a pawl extension from a side edge of a first half portion, and a shoulder, adjacent a confronting edge of a second half portion for snap locking engagement by the pawl.

7. The fishing float as defined in claim 5 wherein the slits extend inwardly to a longitudinal axis defined between first and second half portions in the closed position.

8. The fishing float as defined in claim 5 wherein the flotation means in a cavity is foreshortened at both ends relative to respective end walls thereof to receive the slit projections when the outer shells are in a closed position.

* * * * *